United States Patent Office 3,825,578
Patented July 23, 1974

---

3,825,578
WATER REPELLENT COMPOSITION OF ORGANOSILICON COMPLEX
Otto J. Maltenieks, Marietta, Ga., assignor to Lockheed Aircraft Corporation, Burbank, Calif.
No Drawing. Filed July 27, 1973, Ser. No. 383,058
Int. Cl. C07d 7/18
U.S. Cl. 260—448.8 R
3 Claims

ABSTRACT OF THE DISCLOSURE

A water repellent composition of methyloctadecyldichlorosilane partially hydrolized with isopropanol is disclosed which is useful as a water repellent coating material for both transparent and non-transparent surfaces but has special utility when employed on non-optical surfaces. The useful lifetime of a water repellent coating made with this composition permits its use as a semi-permanent coating for such surfaces.

---

The invention herein described was made in the course of or under a contract with the United States Air Force.

This invention relates in general to water repellent compositions and in particular to a water repellent composition which is effective for long-term use as a rain repellent coating on transparent and non-transparent surfaces alike, having particular utility on non-optical surfaces. By non-optical surfaces is meant surfaces of materials that are not intended to be seen through whether or not they are transparent.

The present invention constitutes, in certain respects, an improvement over my earlier invention which is covered by U.S. Pat. No. 3,721,690 which issued on Mar. 20, 1973 and is entitled "Water Repellent Compositions of Organotin and Organosilicon Complexes." In applying my earlier patented water repellent composition it is necessary to polish the treated surface in order to remove excess, unreacted coating material. Otherwise, the unreacted residue on the surface promotes undesirable wetting.

In certain applications such polishing operations as are required are objectionable. Consider, for example, relatively large installations such as radomes of the type employed at air terminals to facilitate traffic control. This polishing operation can become an enormous time-consuming and laborious operation.

The water repellent composition herein proposed is intended, among other things, to avoid the need for polishing the treated surface in non-optical applications as required in my earlier patent referred to above. Thus, any excess, unreacted coating material on the surface after treatment is completely hydrophobic.

The silane composition is represented by the following formula:

$$R'-\underset{\underset{X}{|}}{\overset{\overset{R}{|}}{Si}}-R''$$

where
R is —$(CH_2)_{17}CH_3$
R' is —

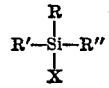

R" is $CH_3$ and
X is —Cl or —OH.

Specific formulations and applications of the present invention is shown in the following examples:

EXAMPLE 1

Using a dry, clean 150 ml. separatory funnel equipped with a $CaCl_2$ or silicate drying tube on top, 36.8 g. Methyloctadecyldichlorosilane and 1.2 g. Thermolite –31 was mixed well by shaking. Thermolite –31, a product of M & T Chemicals, Inc., Rahway, N.J., is described in U.S. Pat. No. 2,648,650.

Thereafter, 15 ml. of isopropanol was added to the mixture, using a vented enclosure or hood and being careful to release the HCl gas into a well-vented area. The HCl thereby developed was frequently released from the funnel. During the addition of the isopropanol, the heat of reaction raised the temperature of the reaction mixture to 50° C.; this mixture was maintained at this temperature until the reaction mixture completely separated into two discrete layers which took about 30 minutes. The top layer (expected product) was the partially hydrolized silane. The bottom layer was unreacted isopropanol containing free HCl gas.

After the 30 minute separation time the bottom layer or portion of the liquid was removed and discarded. It yielded about 10 ml. of isopropanol with HCl gas.

To the top layer, i.e., the partially hydrolized silane, was added 15 ml. of fresh isopropanol and this mixture was shaken well in the funnel, after which the HCl gas was released.

The funnel was then placed in an oven preheated to 70° C. where it was maintained for 4 hours at 70° C. After this 4-hour period the bottom layer was removed and discarded. The bottom layer contained 11 ml. of strongly acidified isopropanol and also some milky-appearing by-products.

To the top layer 10 ml. of fresh isopropanol was added and shaken well. The funnel was then placed in an oven preheated to 70° C., where it was kept for about 18 hours. After this final reaction the bottom layer was carefully removed. It consisted of approximately 7 to 8 ml. of isopropanol containing HCl gas. After removal of the bottom layer the remaining product was transferred into a clean, dry glass bottle. The final product yield as 43 grams of heavy reddish-yellow oil, which was identified as the chlorosilane.

EXAMPLE 2

The chlorosilane product from Example 1 was dissolved in 50 ml. of toluene and heated to 20° C. and carefully hydrolized with 10 ml. of a mixture of isopropyl alcohol +5 percent aqueous KOH solution. The hydrolized product was cooled to room temperature and transferred into a separatory funnel. The product separated into two layers, the top layer containing the hydrolyzed silane in which the Cl-atoms were replaced by OH groups and the bottom layer containing isopropanol-hydrochloride and other by-products. After evaporation of toluene from the top layer solution, a semi-solid product was isolated and identified as the hydrolized silane.

It should be noted that the foregoing relate only to preferred embodiments of the invention and that numerous modifications or alterations may be made therein without

What is claimed is:
1. The water repellent composition
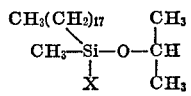
where X is either —Cl or —OH.
2. The composition as in Claim 1 wherein X is —Cl.
3. The composition as in Claim 1 wherein X is —OH.
References Cited
UNITED STATES PATENTS
3,721,691  3/1973  Maltenieks ___ 260—448.8 R UX
DANIEL E. WYMAN, Primary Examiner
P. F. SHAVER, Assistant Examiner
U.S. Cl. X.R.
106—13; 117—121